United States Patent
Patel et al.

(10) Patent No.: US 9,830,110 B2
(45) Date of Patent: Nov. 28, 2017

(54) SYSTEM AND METHOD TO ENABLE DYNAMIC CHANGES TO VIRTUAL DISK STRIPE ELEMENT SIZES ON A STORAGE CONTROLLER

(71) Applicant: Dell Products, LP, Round Rock, TX (US)

(72) Inventors: Dharmesh Patel, Round Rock, TX (US); Jenwei Hsieh, Austin, TX (US); Rizwan Ali, Cedar Pakr, TX (US); Mahmoud Ahmadian, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 320 days.

(21) Appl. No.: 14/310,203

(22) Filed: Jun. 20, 2014

(65) Prior Publication Data

US 2015/0370716 A1    Dec. 24, 2015

(51) Int. Cl.
*G06F 3/06*    (2006.01)

(52) U.S. Cl.
CPC ............ *G06F 3/0685* (2013.01); *G06F 3/064* (2013.01); *G06F 3/0608* (2013.01); *G06F 3/0689* (2013.01)

(58) Field of Classification Search
CPC .................................................... G06F 3/0689
USPC ........................................................ 711/114
See application file for complete search history.

(56) References Cited

U.S. PATENT DOCUMENTS

| | | | |
|---|---|---|---|
| 5,574,851 A * | 11/1996 | Rathunde | G06F 3/0604 711/114 |
| 6,223,300 B1 * | 4/2001 | Gotoh | G06F 3/0607 711/114 |
| 7,133,965 B2 | 11/2006 | Chien | |
| 8,560,772 B1 * | 10/2013 | Piszczek | G06F 11/1076 711/114 |
| 2004/0225926 A1 * | 11/2004 | Scales | G06F 3/0611 714/43 |
| 2006/0277350 A1 | 12/2006 | Lubbers | |
| 2007/0011401 A1 * | 1/2007 | Zhang | G06F 3/061 711/114 |
| 2009/0198885 A1 | 8/2009 | Manoj | |
| 2009/0327604 A1 * | 12/2009 | Sato | G06F 3/0614 711/114 |
| 2011/0307660 A1 | 12/2011 | Yang | |
| 2012/0072680 A1 * | 3/2012 | Kimura | G06F 11/108 711/154 |
| 2013/0262920 A1 * | 10/2013 | Jung | G06F 11/1076 714/6.22 |
| 2014/0032836 A1 * | 1/2014 | Pan | G06F 11/108 711/114 |

* cited by examiner

*Primary Examiner* — Prasith Thammavong
(74) *Attorney, Agent, or Firm* — Larson Newman, LLP (57) ABSTRACT

A storage controller includes a storage controller memory to store virtual disk metadata including an original stripe size (OSS) field and a logical stripe size (LSS) field, and a cache memory having an OSS buffer and a LSS buffer. The storage controller stores a first block size in the OSS field, configures a RAID array to provide storage blocks of the first block size based on the OSS field, stores a second block size in the LSS field, receives a first data transaction that includes a first data block of the second block size based upon the LSS field, maps the first data block from the second block size to the first block size, and executes the first data transaction on the RAID array using the first block size.

20 Claims, 5 Drawing Sheets

SYSTEM AND METHOD TO ENABLE DYNAMIC CHANGES TO VIRTUAL DISK STRIPE ELEMENT SIZES ON A STORAGE CONTROLLER

FIELD OF THE DISCLOSURE

This disclosure generally relates to information handling systems, and more particularly relates to enabling dynamic changes to virtual disk stripe element sizes on a storage controller.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
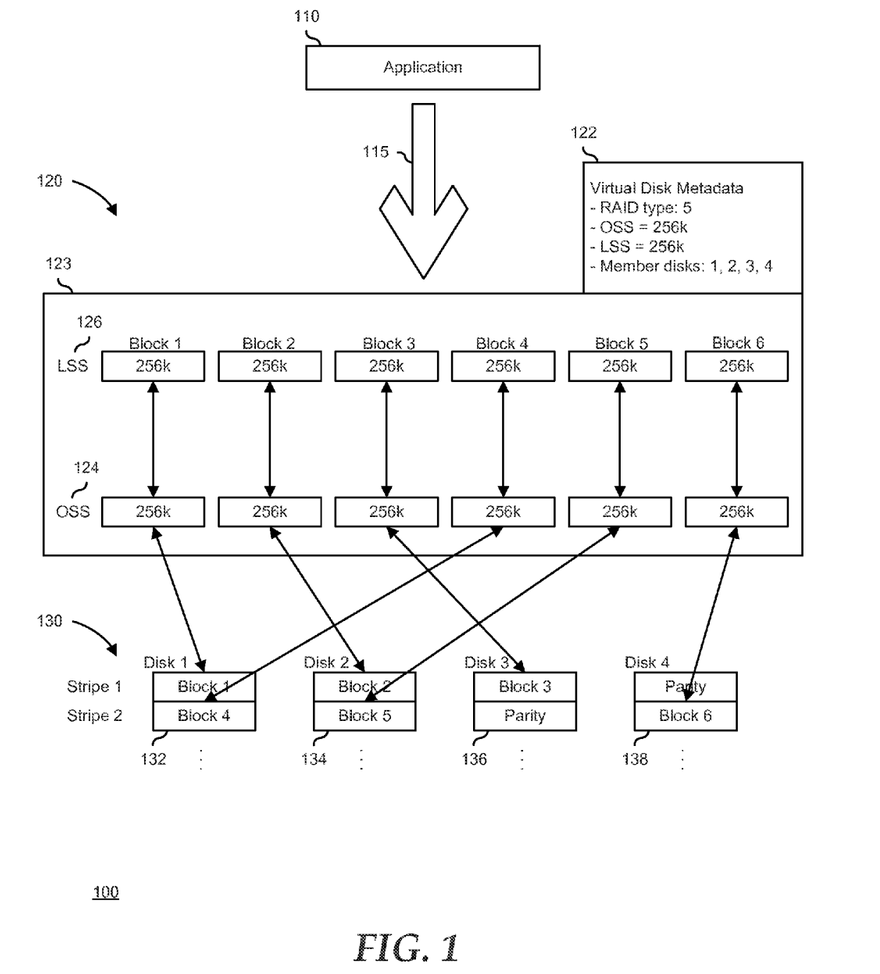
FIGS. 1-3 are block diagrams of a storage system, and illustrate a method for enabling dynamic changes to virtual disk stripe element sizes on a storage controller, according to an embodiment of the present disclosure.
Figure 2:
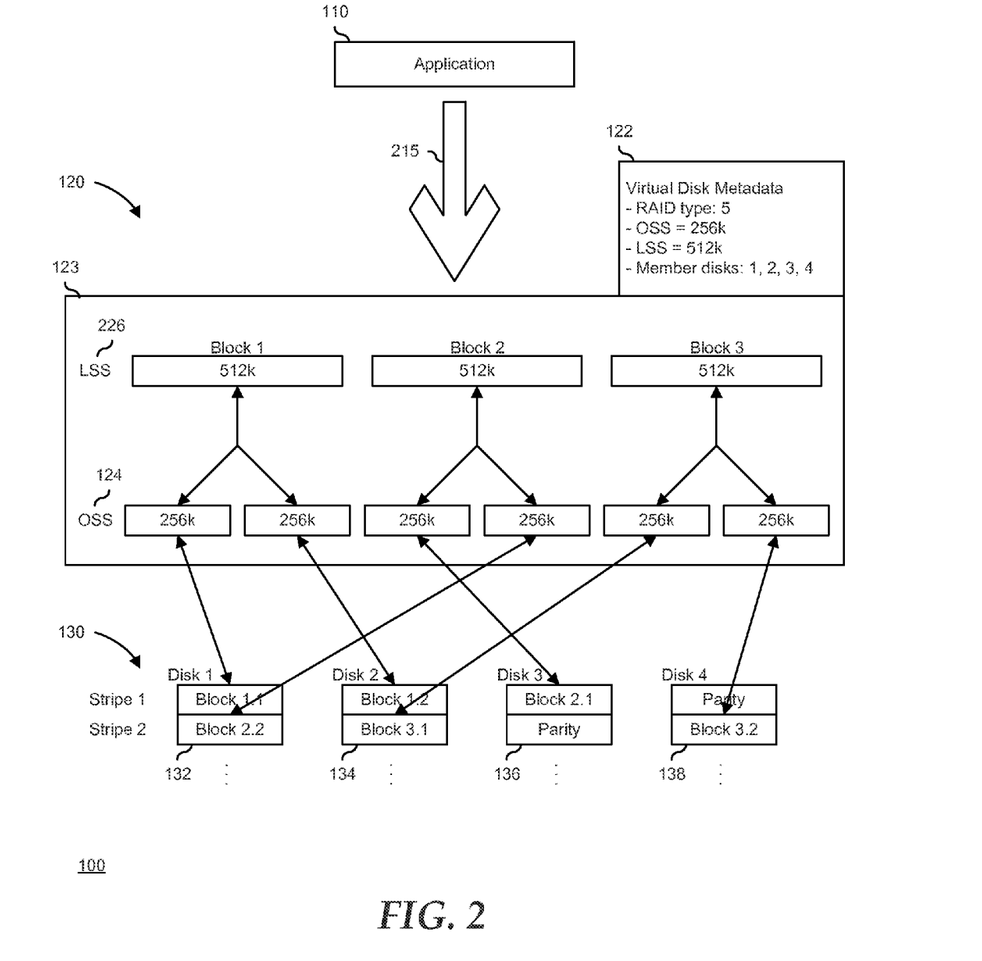
Figure 3:
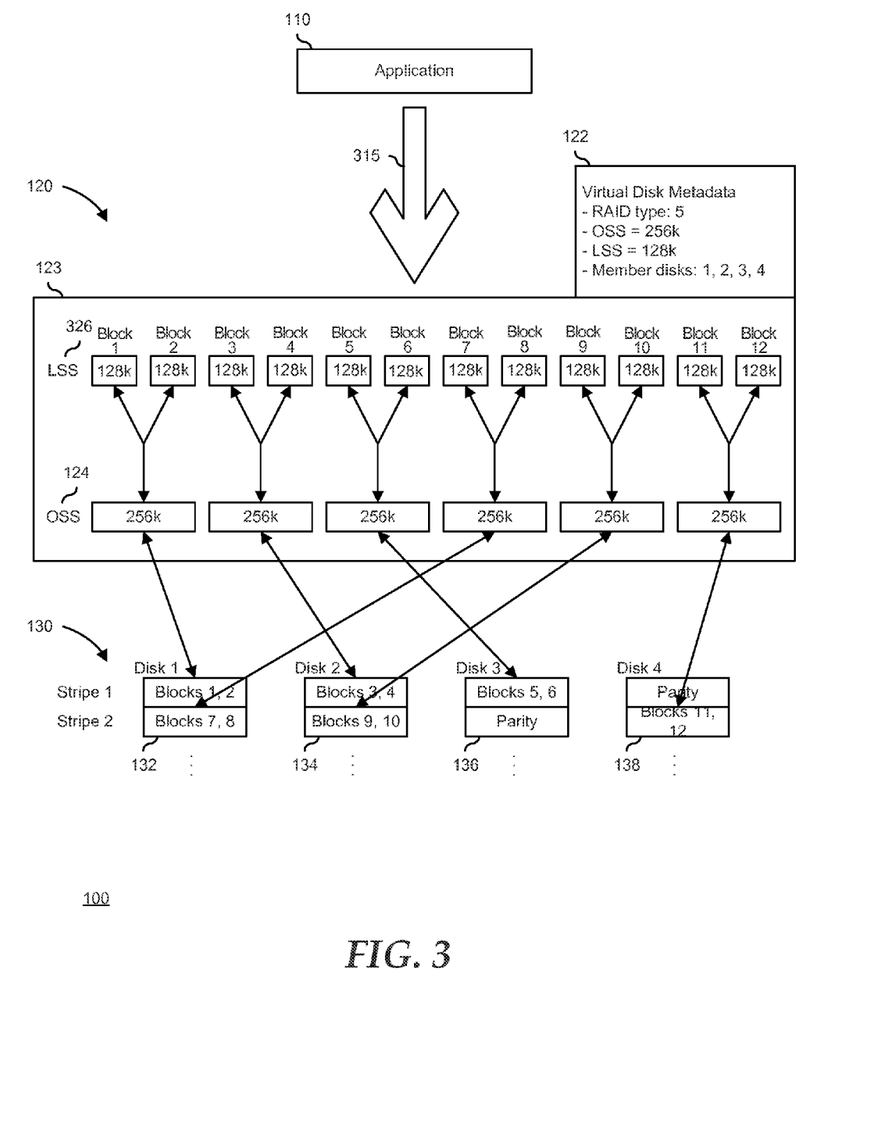

FIGS. 1-3 illustrate a storage system 100 that can be implemented on one or more information handling system. For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An example of an information handling system includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like. FIGS. 1-3 also illustrate a method for enabling dynamic changes to virtual disk stripe element sizes on a storage controller.

Storage system 100 includes an application 110, a storage controller 120, and a storage array 130. Application 110 represents a source of data transactions 115 that are targeted to storage array 130. As such, application 110 can represent an information handling system, a network, an software program on an information handling system or a network, another source of data transactions, or a combination thereof. Data transactions 115 can include data read transactions, data write transactions, data delete transactions, data modify transactions, storage volume creation transactions, storage volume delete transactions, storage volume mapping transactions, storage volume information request transactions, storage volume control transactions, other data transactions, or a combination thereof. In a particular embodiment, storage controller 120 is included with storage array 130. In another embodiment, storage controller 120 is separate from storage array 130, such as where a storage controller is included in an information handling system and that is connected to a storage array in a storage area network (SAN) or a network attached storage (NAS).

Storage array 130 includes storage devices 132, 134, 136, and 138. Storage array 130 represents a data storage capacity for storage system 100 to store data from, or provide stored data to application 110. As such, storage devices 132, 134, 136, and 138 can each represent one or more physical disk drives, one or more logical disk drives, one or more partitions on physical disk drives, another physical or logical device, or a combination thereof.

Storage controller 120 includes a controller memory 122 for storing virtual disk metadata, and a storage cache 123 that acts as a memory buffer for improving I/O access times between application 110 and storage array 130. Storage controller 120 operates to implement a Redundant Array of Independent Drives (RAID) storage scheme on storage array 130, such that data stored on the storage array is redundant and/or recoverable in the case of disk errors. An example of a storage controller includes a Serial ATA (SATA) controller, a FibreChannel controller, a Small Computer System Interface (SCSI) controller, a Serial Attached SCSI (SAS) controller, an Internet SCSI (iSCSI) controller, another type of storage controller, or a combination thereof.

When storage system 100 is initially configured, storage controller 120 is set up to instantiate a virtual disk in accordance with the virtual disk metadata stored in controller memory 122. As illustrated, storage controller 120 operates to provide a virtual disk that includes member storage devices 132, 134, 136, and 138. The member storage devices are configured in a RAID 5 configuration which provides block-level striping with distributed parity. The skilled artisan will recognize that the teachings of the present disclosure are not limited by the choice of RAID configuration, but that the teachings herein are applicable to other RAID configurations, such as RAIDs 1-4, 6, 10, 50, and 60, or other virtual disk storage configurations, as needed or desired. For example, the member storage devices can be configured in a RAID 6 configuration which provides block-level striping with multiple distributed parity blocks, or other RAID configurations, as needed or desired.

Further storage configuration information included in the virtual disk metadata stored in controller memory 122 includes original stripe size (OSS) information and logical stripe size (LSS) information. The OSS information defines a stripe size for the data that is stored on each of storage devices 132, 134, 136, and 138. Examples of stripe sizes includes 64 kiloBytes (kB), 128 kB, 256 kB, 512 kB, 1024 kB (also referred to as 1 megaByte), or another stripe size, as needed or desired. Here, as an example, the OSS information provides that the RAID array be configured with 256 kB stripe size. The LSS information identifies the stripe size that is utilized by application 110 for the data transactions between the application and storage array 130. As originally configured, the LSS information is the same as the OSS information. As such, in this example, the LSS information provides that the stripe size utilized by application 110 is 256 kB.

Storage controller 120 operates to map data transaction 115 from application 110 that utilize the stripe size indicated by the LSS information into operations onto storage array 130 that utilizes the stripe size indicated by the OSS information. As such, storage cache 123 includes an OSS buffer 124 and an LSS buffer 126. Here, data transaction 115 represents an exemplary transaction, such as a read or a write transaction, that calls for a 1.5 mB data transaction. Application 110 provides for a data transaction with storage controller 120 in six (6) data blocks of 256 kB each, that is, the stripe size indicated by the LSS information, labeled here as blocks 1-6, that are stored in respective blocks of LSS buffer 126. Storage controller 120 operates to map LSS buffer 126 onto OSS buffer 124, such that each block of the LSS buffer is uniquely mapped to a corresponding block of the OSS buffer. Storage controller 120 then operates to perform the requested data transaction on storage array 130 based upon the stripe size indicated by the OSS information. Here, block 1 is provided to a first stripe of storage device 132, block 2 is provided to the first stripe of storage device 134, block 3 is provided to the first stripe of storage device 136, and the parity information for the first stripe is provided on storage device 138. Continuing, block 4 is provided to a second stripe of storage device 132, block 5 is provided to the second stripe of storage device 134, block 6 is provided to the second stripe of storage device 138, and the parity information for the second stripe is provided on storage device 136.

Storage controller 120 operates to provide for dynamic changes to the stripe element sizes that are provided from application 110 by reprogramming the LSS information in the virtual disk metadata stored on controller memory 122. For example, the LSS information can provide for larger or smaller blocks to be provided in the data transactions between application 110 and storage array 130. However, in spite of any changes to the LSS information, the underlying storage behavior of storage controller 120 in the transactions with storage array 130 remains unchanged, and the OSS information remains fixed.

FIG. 2 illustrates storage system 100 where the LSS information is modified to provide for larger block data transactions with between application 110 and storage controller 120. Here, storage controller 120 operates to map data transaction 215 from application 110 that utilizes the stripe size indicated by the new LSS information (512 kB) into operations onto storage array 130 that utilize the stripe size indicated by the OSS information (256 kB). As such, storage cache 123 includes an LSS buffer 226. Data transaction 215 represents an exemplary transaction that calls for a 1.5 mB data transaction, and application 110 provides for a data transaction with storage controller 120 in three (3) data blocks of 512 kB each, that is, the stripe size indicated by the LSS information, labeled here as blocks 1-3, that are stored in respective blocks of LSS buffer 226. Storage controller 120 operates to map LSS buffer 226 onto OSS buffer 124, such that each block of the LSS buffer is uniquely mapped to a corresponding two blocks of the OSS buffer. Storage controller 120 then operates to perform the requested data transaction on storage array 130 based upon the stripe size indicated by the OSS information. Here, a first portion of block 1 is provided to a first stripe of storage device 132, the second portion of block 1 is provided to the first stripe of storage device 134, a first portion of block 2 is provided to the first stripe of storage device 136, and the parity information for the first stripe is provided on storage device 138. Continuing, the second portion of block 2 is provided to a second stripe of storage device 132, a first portion of block 3 is provided to the second stripe of storage device 134, the second portion of block 3 is provided to the second stripe of storage device 138, and the parity information for the second stripe is provided on storage device 136.

FIG. 3 illustrates storage system 100 where the LSS information is modified to provide for smaller block data transactions with between application 110 and storage controller 120. Here, storage controller 120 operates to map data transaction 315 from application 110 that utilizes the stripe size indicated by the new LSS information (128 kB) into operations onto storage array 130 that utilize the stripe size indicated by the OSS information (256 kB). As such, storage cache 123 includes an LSS buffer 326. Data transaction 315 represents an exemplary transaction that calls for a 1.5 mB data transaction, and application 110 provides for a data transaction with storage controller 120 in twelve (12) data blocks of 128 kB each, that is, the stripe size indicated by the LSS information, labeled here as blocks 1-12, that are stored in respective blocks of LSS buffer 326. Storage controller 120 operates to map LSS buffer 326 onto OSS buffer 124, such that each two sequential blocks of the LSS buffer are mapped to a corresponding block of the OSS buffer. Storage controller 120 then operates to perform the requested data transaction on storage array 130 based upon the stripe size indicated by the OSS information. Here, blocks 1 and 2 are provided to a first stripe of storage device 132, blocks 3 and 4 are provided to the first stripe of storage device 134, blocks 5 and 6 are provided to the first stripe of storage device 136, and the parity information for the first stripe is on storage device 138. Continuing, blocks 7 and 8 are provided to a second stripe of storage device 132, blocks 9 and 10 are provided to the second stripe of storage device 134, blocks 11 and 12 are provided to the first stripe of storage device 138, and the parity information for the first stripe is provided to the first stripe of storage device 136.

Thus as illustrated in FIGS. 1-3 above, storage controller 120 is operable to represent storage array 130 as being configured with different block sizes to application 110, while maintaining the underlying disk operations consistently with the block size configuration of the storage array as originally configured. In a particular embodiment, OSS buffer 124 and LSS buffers 126, 226, and 326 each represent separate memory locations within storage cache 123 and the mapping as described above includes transferring of the transaction data from one memory location to another location. In another embodiment, the OSS buffer and the LSS buffers represent shared memory locations within the storage cache and the mapping includes managing of pointers to the storage cache which represent the various OSS and LSS boundaries. In particular, OSS buffer 124, LSS buffer 126, LSS buffer 226, and LSS buffer 326 can represent a common buffer that operates on different block sizes based upon the contents of the OSS information and LSS information stored in controller memory 122. In a particular embodiment, application 110 can dynamically write to controller memory 122 to change the LSS information as needed or desired, to accommodate different program needs. For example, where application 110 operates a text message program, the application can change the LSS information to provide for smaller block sizes, such as 64 kB blocks or 128 kB blocks, and where the application operates a mail server program, the application can change the LSS information to provide for larger block sizes, such as 512 kB or 1 mB. In a particular embodiment, storage controller 120 includes a processor, and controller memory 122 includes code executable by the processor to perform the operations and methods as described above.

Figure 4:
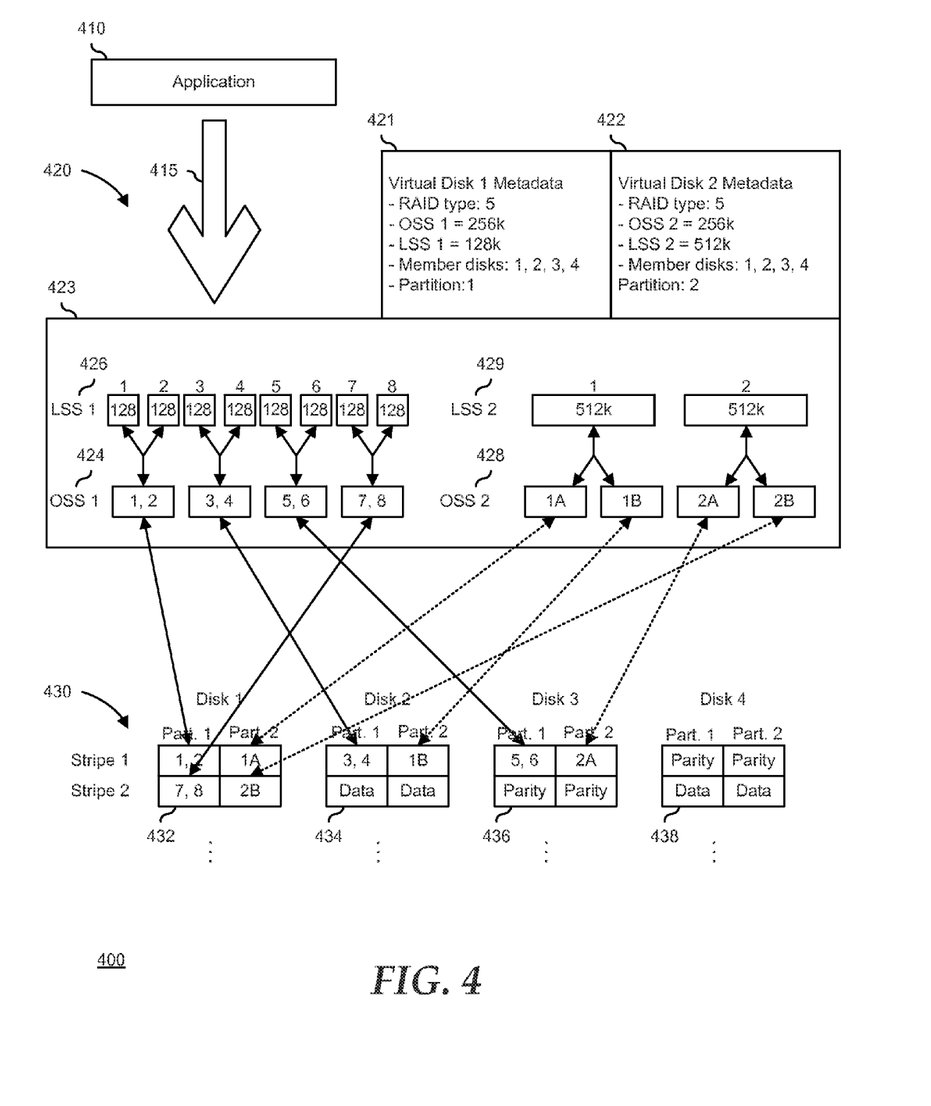
FIG. 4 is a block diagram of a storage system according to another embodiment of the present disclosure.

FIG. 4 illustrates a storage system 400, similar to storage system 100, including an application 410 similar to application 110, a storage controller 420, and a storage array 430 similar to storage array 130. Storage controller 420 includes a controller memory for storing virtual disk metadata for a first virtual disk 421 and a second virtual disk 422, and a storage cache 423 that acts as a memory buffer for improving I/O access times between application 410 and storage array 430. Storage controller 420 operates to implement a RAID storage scheme on storage array 430, such that data stored on the storage array is redundant and/or recoverable in the case of disk errors. When storage system 400 is initially configured, storage controller 420 is set up to instantiate a first virtual disk in accordance with first virtual disk metadata 421, on a first partition of storage devices 432, 434, 436, and 438, and to instantiate a second virtual disk in accordance with second virtual disk metadata 422, on a second partition of the storage devices. Storage devices 432, 434, 436, and 438 are illustrated as being configured in two partitions, each with a RAID 5 configuration, but the skilled artisan will recognize that other RAID configurations can be provided by the storage array, as needed or desired.

Further storage configuration information included in first virtual disk metadata 421 includes OSS information (OSS 1) and LSS information (LSS 1), and further storage configuration information included in second virtual disk metadata 422 includes OSS information (OSS 2) and LSS information (LSS 2). Here, as an example, the OSS 1 information provides that the first partition of the RAID array be configured with 256 kB stripe size and the OSS 2 information provides that the second partition of the RAID array be configured with 256 kB stripe size. The LSS 1 information identifies that a stripe size that is utilized by application 410 for the data transactions between the application and the first partition of storage array 430 is 128 kB, and the LSS 2 information identifies that a stripe size that is utilized by the application for the data transactions between the application and the second partition of the storage array is 256 kB.

Here, application 410 represents multiple data streams, such as from different programs, virtual private networks, virtual machines, or other various sources of data transactions that can utilize different block sizes. As such, storage controller 420 operates to map data transaction 415 from application 410 that are directed to the first partition into operations onto storage array 430 that utilize the stripe size indicated by the OSS 1 information, and to map data transaction 415 from the application that are directed to the second partition into operations onto the storage array that utilize the stripe size indicated by the OSS 2 information. As such, storage cache 423 includes an OSS 1 buffer 424, an LSS buffers 426, an OSS 2 buffer 428, and an LSS 2 buffer 429. Here, data transaction 415 represents an exemplary transaction, such as a read or a write transaction, that calls for a 1 mB data transaction. Application 410 provides for a data transaction with storage controller 420 in a number of data blocks that corresponds with the block size of data transaction 415.

Thus, if data transaction 415 is directed to the first partition of storage array 430, then eight (8) blocks of 128 kB each are stored in respective blocks of LSS 1 buffer 426, and storage controller 420 operates to map LSS 1 buffer 426 onto OSS 1 buffer 424, such that each successive two blocks of the LSS 1 buffer are mapped to a corresponding block of the OSS 1 buffer, and the storage controller then performs the requested data transaction on the first partition of storage array 430 based upon the stripe size indicated by the OSS 1 information (256 kB). Similarly, if data transaction 415 is directed to the second partition of storage array 430, then two (2) blocks of 512 kB each are stored in respective blocks of LSS 2 buffer 429, and storage controller 420 operates to map LSS 2 buffer 429 onto OSS 2 buffer 428, such that each block of the LSS 2 buffer is uniquely mapped to a corresponding two blocks of the OSS 2 buffer, and the storage controller then performs the requested data transaction on the second partition of storage array 430 based upon the stripe size indicated by the OSS 2 information (256 kB).

Thus storage controller 420 is operable to represent storage array 430 as being configured as multiple virtual disks to application 410, while maintaining the underlying disk operations consistently with the block size configuration of each partition of the storage array as originally configured. The skilled artisan will recognize that OSS 1 buffer 424, LSS 1 buffer 426, OSS 2 buffer 428, and LSS 2 buffer 429 may represent separate memory locations within storage cache 423 and the mapping as described above may include transferring of the transaction data from one memory location to another location, or the OSS 1 and 2 buffers and the LSS 1 and 2 buffers can represent shared memory locations within the storage cache and the mapping may include managing of pointers to the storage cache which represent the various OSS and LSS boundaries.

Figure 5:
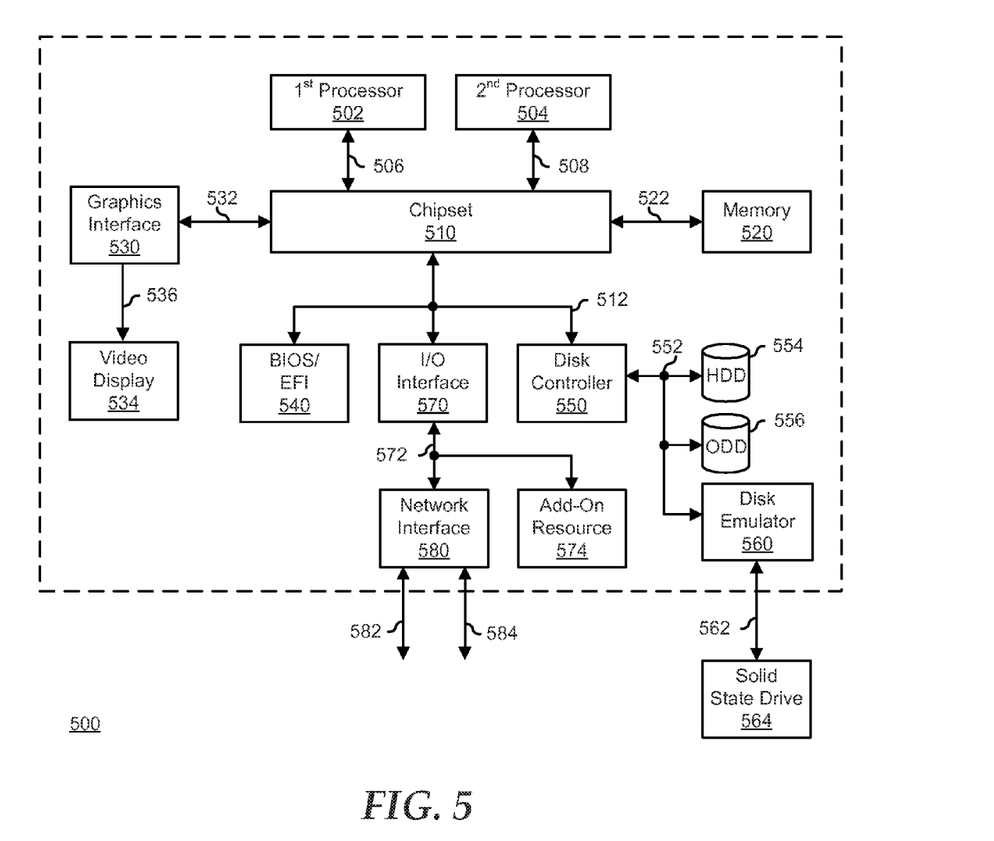
FIG. 5 is a block diagram of a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574 and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A storage controller comprising:
   a storage controller memory operable to store virtual disk metadata including a first original stripe size (OSS) field that defines a first original stripe size for data associated with a first virtual disk that is stored on each storage device of a redundant array of independent drives (RAID) array, a second OSS field that defines a second original stripe size for data associated with a second virtual disk that is stored on each storage device of the RAID array, a first logical stripe size (LSS) field that identifies a first logical stripe size that is utilized by a first application that provides data transactions to the first virtual disk, and a second LSS field that identifies a second logical stripe size that is utilized by a second application that provides data transactions to the second virtual disk; and
   a cache memory comprising a first OSS buffer, a second OSS buffer, a first LSS buffer, and a second LSS buffer, the storage controller to:
   store first stripe size information in the first and second OSS fields;
   configure the RAID array to provide stripe of a first stripe size based on the first stripe size information in the first and second OSS fields;
   store second stripe size information in the first LSS field, wherein the second stripe size information defines a second stripe size that is smaller than the first stripe size;
   store third stripe size information in the second LSS field, wherein the third stripe size information defines a third stripe size that is larger than the first stripe size;
   receive a first data transaction from the first application, wherein the first data transaction includes a first data block of the second stripe size based upon the second stripe size information in the first LSS field;
   map the first data block from the second stripe size to the first stripe size;
   execute the first data transaction on the RAID array using the first stripe size;
   receive a second data transaction from the second application, wherein the second data transaction includes a second data block of the third stripe size based upon the third stripe size information in the second LSS field;
   map the second data block from the third stripe size to the first stripe size; and
   execute the second data transaction on the RAID array using the first stripe size.

2. The storage controller of claim 1, wherein the first stripe size is different from the second stripe size.

3. The storage controller of claim 2, wherein the storage controller is further to:
   store fourth stripe size information in the first LSS field;
   receive a third data transaction, wherein the second data transaction includes a third data block of a fourth stripe size based upon the fourth stripe size information in the first LSS field;
   map the third data block from the fourth stripe size to the first stripe size; and
   execute the third data transaction on the RAID array using the first stripe size.

4. The storage controller of claim 3, wherein the fourth stripe size is different from the first stripe size and the second stripe size.

5. The storage controller of claim 1, wherein:
   the virtual disk metadata further includes a RAID type field; and
   the storage controller is further to:
   store a RAID type in the RAID type field; and
   configure the RAID array based on the RAID type field.

6. The storage controller of claim 5, wherein the RAID type comprises one of RAID 1, RAID 2, RAID 3, RAID 4, RAID 5, and RAID 6.

7. The storage controller of claim 1, wherein the storage controller comprises at least one of a Serial-ATA controller, a FibreChannel controller, a Small Computer System Interface (SCSI) controller, a Serial Attached SCSI controller, and an Internet-SCSI controller.

8. A method comprising:
   storing first stripe size information in a first original stripe size (OSS) field of a memory of a storage controller, wherein the first OSS field defines a first original stripe size for data associated with a first virtual disk that is stored on each storage device of a redundant array of independent drives (RAID) array;
   storing the first stripe size information in a second OSS field of the memory wherein the second OSS field defines a second original stripe size for data associated with a second virtual disk that is stored on each storage device of the RAID array;
   configuring the RAID array to provide stripes of a first stripe size based on the first stripe size information in the first OSS field;
   storing second stripe size information in a first logical stripe size (LSS) field of the storage controller memory, wherein the first LSS field identifies a second stripe size that is utilized by a first application that provides data transactions with the first virtual disk, wherein the second stripe size is smaller than the first stripe size;
   storing third stripe size information in a second LSS field of the storage controller memory, wherein the second LSS field identifies a third logical stripe size that is utilized by a second application that provides data transactions with the second virtual disk, wherein the third stripe size is larger than the first stripe size;
   receiving, at the storage controller, a first data transaction from the first application, wherein the first data transaction includes a first data block of the second stripe size based upon the second stripe size information in the first LSS field;
   mapping the first data block from the second stripe size to the first stripe size;

executing the first data transaction on the RAID array using the first stripe size;

receiving, at the storage controller, a second data transaction from the second application, wherein the second data transaction includes a second data block of the third stripe size based upon the third stripe size information in the second LSS field;

mapping the second data block from the third stripe size to the first stripe size; and executing the second data transaction on the RAID array using the first stripe size.

9. The method of claim 8, wherein the first stripe size is different from the second stripe size.

10. The method of claim 9, further comprising:
storing fourth stripe size information in the first LSS field;
receiving a third data transaction from the first application, wherein the third data transaction includes a third data block of a fourth stripe size based upon the fourth stripe size information in the first LSS field;
mapping the third data block from the fourth stripe size to the first stripe size; and
executing the third data transaction on the RAID array using the first stripe size.

11. The method of claim 10, wherein the fourth stripe size is different from the first stripe size and the second stripe size.

12. The method of claim 8, further comprising:
storing a RAID type in a RAID type field of the storage controller memory; and
configuring the RAID array based on the RAID type field.

13. The method of claim 12, wherein the RAID type comprises one of RAID 1, RAID 2, RAID 3, RAID 4, RAID 5, and RAID 6.

14. The method of claim 8, wherein the storage controller comprises at least one of a Serial-ATA controller, a Fibre-Channel controller, a Small Computer System Interface (SCSI) controller, a Serial Attached SCSI controller, and an Internet-SCSI controller.

15. A non-transitory computer-readable medium including code for performing a method, the method comprising:
storing first stripe size information in a first original stripe size (OSS) field of a storage controller memory, wherein the first OSS field defines a first original stripe size for data associated with a first virtual disk that is stored on each storage device of a redundant array of independent drives (RAID) array;
storing the first stripe size information in a second OSS field of the memory, wherein the second OSS field defines a second original stripe size for data associated with a second virtual disk that is stored on each storage device of the RAID array;
storing third stripe size information in a second LSS field of the storage controller memory, wherein the second LSS field identifies a third logical stripe size that is utilized by a second application that provides data transactions with the second virtual disk, wherein the third stripe size is larger than the first stripe size;
configuring the RAID array to provide stripes of the first stripe size based on the first stripe size information in the first OSS field;
storing second stripe size information in a first logical stripe size (LSS) field of the storage controller memory, wherein the first LSS field identifies a second stripe size that is utilized by an first application that provides data transactions with the first virtual disk, wherein the second stripe size is smaller than the first stripe size;
receiving, at the storage controller, a first data transaction from the first application, wherein the first data transaction includes a first data block of the second stripe size based upon the second stripe size information in the first LSS field;
mapping the first data block from the second stripe size to the first stripe size;
executing the first data transaction on the RAID array using the first stripe size
receiving, at the storage controller, a second data transaction from the second application, wherein the second data transaction includes a second data block of the third stripe size based upon the third stripe size information in the second LSS field;
mapping the second data block from the third stripe size to the first stripe size; and
executing the second data transaction on the RAID array using the first stripe size.

16. The computer-readable medium of claim 15, wherein the first stripe size is different from the second stripe size.

17. The computer-readable medium of claim 16, the method further comprising:
storing fourth stripe size information in the first LSS field;
receiving a third data transaction from the first application, wherein the third data transaction includes a third data block of the third stripe size based upon the third stripe size information in the first LSS field;
mapping the third data block from the third stripe size to the first stripe size; and
executing the third data transaction on the RAID array using the first stripe size.

18. The computer-readable medium of claim 17, wherein the fourth stripe size is different from the first stripe size and the second stripe size.

19. The computer-readable medium of claim 15, the method further comprising:
storing a RAID type in a RAID type field of the storage controller memory; and
configuring the RAID array based on the RAID type field.

20. The computer-readable medium of claim 15, wherein the storage controller comprises at least one of a Serial-ATA controller, a FibreChannel controller, a Small Computer System Interface (SCSI) controller, a Serial Attached SCSI controller, and an Internet-SCSI controller.

* * * * *